United States Patent [19]

Erdelitsch et al.

[11] Patent Number: 4,678,875
[45] Date of Patent: Jul. 7, 1987

[54] STEERING COLUMN SWITCH FOR MOTOR VEHICLES

[75] Inventors: Herbert Erdelitsch; Walter Hecht, both of Bietigheim-Bissingen, Fed. Rep. of Germany

[73] Assignee: WSWF Auto-Electric GmbH, Bissingen, Fed. Rep. of Germany

[21] Appl. No.: 796,648

[22] Filed: Nov. 8, 1985

[30] Foreign Application Priority Data

Nov. 8, 1984 [DE] Fed. Rep. of Germany ....... 3440763

[51] Int. Cl.⁴ ...................... H01H 9/00; H01H 25/04
[52] U.S. Cl. ............................. 200/61.54; 200/61.27
[58] Field of Search ...................... 200/61.27–61.38, 200/61.54–61.57, 4

[56] References Cited

U.S. PATENT DOCUMENTS 3,892,932  7/1975  Erdelitsch et al. .......... 200/61.35 X
4,336,428  6/1982  Berginski .................. 200/61.54

Primary Examiner—J. R. Scott
Attorney, Agent, or Firm—Donald J. Lenkszus

[57] ABSTRACT

A steering column switch has two switching members superposed in a housing, which are swivellable about two parallel axes at least substantially diametrically opposite each other relative to a central aperture and tiltable perpendicularly to the swivelling plane. Two planar insulating plates provided with metal conductors stand perpendicularly on the swivelling plane. Each insulating plate has a free end formed as plug part and on one of these plates it is changed over when one switching member is tilted. To simplify the construction of the switch and to lower contact resistances switch contacts are also changed over on one of the two perpendicularly standing insulating plates with a tilting of the other switching member and with a swivelling of each of the two switching members.

29 Claims, 7 Drawing Figures

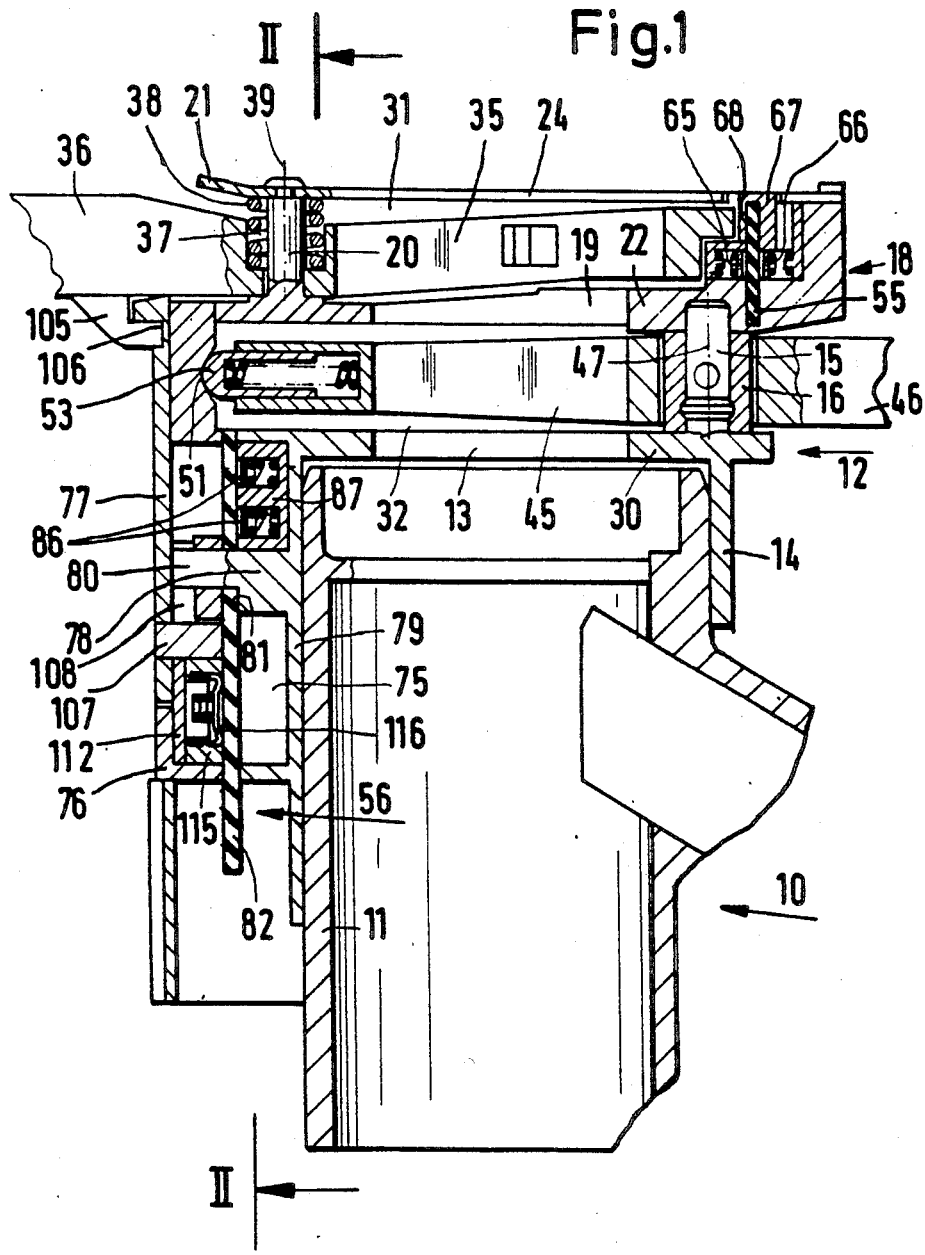

STEERING COLUMN SWITCH FOR MOTOR VEHICLES

BACKGROUND OF THE INVENTION

The invention pertains to a steering column switch for motor vehicles.

One steering column switch is known from German specification No. AS 2 828 592 and U.S. Pat. No. 4,336,428. The housing of this steering column switch has a central aperture, through which the steering spindle of a motor vehicle can extend. The housing interior is divided into two chambers by an insulating plate, which is provided with metal conductors on both sides and which is positioned perpendicularly to the axis of the central aperture. In each chamber, there is an annular switching member with switch lever. The two switching members are swivellable about axes, which are parallel to each other and relative to the central aperture in the housing at least substantially diametrically opposite to each other and tiltable perpendicularly to the swivelling plane. If one switching member is swivelled, the direction indicator or the parking light is controlled thereby. Selection between headlight high beam and lower beam as well as operation of the horn can be controlled by tilting this switching member. The windshield wiper system is controlled by swivelling the other switching member. Finally the windshield washer system and the rear window wiper and washer system can be set into operation by tilting this switching member.

On the insulating plate positioned horizontally in the housing of the known switch there are arranged two rectangularly extending insulating plates also equipped with metal conductors on both sides. Associated metal conductors of the horizontally positioned insulating plate and of the insulating plates standing perpendicularly thereupon are electrically interconnected. The free ends of the perpendicularly standing insulating plates are formed as plugs part for multiple couplings.

One perpendicularly standing insulating plate and one side of the other perpendicularly standing insulating plate only serve to conduct the metal conductors of the horizontally positioned insulating plate to the outside. In contrast thereto switching between high beam and lower beam on one side of one perpendicularly standing insulating plate occurs when one switching member is tilted. Furthermore a metal conductor for operating the headlamp flasher is provided on this side of the insulating plate.

SUMMARY OF THE INVENTION

In accordance with the invention a steering column switch has two switching members superposed in a housing, which are swivelled about two parallel axes substantially diametrically opposite each other relative to a central aperture and tiltable perpendicularly to the swivelling plane. Two planar insulating switch plates provided with metal conductors stand perpendicularly on the swivelling plane. Each insulated switch plate has a free end formed as plug part and on one of these plates it is changed over when one switching member is tilted. It is also changed over with a tilting of the other switching member and with a swivelling of each one of the two switching members on one of the two perpendicularly standing insulating plates. Thus in a steering column switch according to the invention there is no insulating plate horizontally positioned in the housing. In the production of the steering column switch that working step is omitted in which the perpendicularly standing insulating plates and their metal conductors have to be connected mechanically and electrically with the horizontally positioned printed circuit board and its metal conductors. The construction and production of the steering column switch according to the invention becomes simple and cheap. It is furthermore possible to constructively associate one insulating plate to one switching member and to a housing portion and the other insulating plate to the other switching member and thus create two partial switches which can be exchanged separately.

In an embodiment of the invention the two insulating plates extend in parallel to each other and are positioned opposite each other with regard to the central aperture in the housing. In addition the two insulating plates are suitably arranged in such a way that they stand perpendicularly on a distance line connecting the axis of the central aperture with the swivelling axis of a switching member. With this arrangement swivelling and tilting motions of the switching members may be transmitted to the bridging contacts co-operating with the metal conductors of the insulating plates.

In a steering column switch according to the invention the two switching members are superposed. It is advantageous if one insulating plate overlaps the switching member in the area of the swivelling axis.

Advantageously the insulating plates are on both sides provided with metal conductors. This is even of advantage, if only one side of an insulating plate were necessary for the metal conductors provided. If the insulating plate is coated on both sides, the same metal conductors can be provided on both sides and corresponding metal conductors of different sides can be connected in an electrically conductive manner. In this way the electric contact resistance is reduced.

BRIEF DESCRIPTION OF THE DRAWING

The invention will be better understood from a reading of the following detailed description in conjunction with the drawing in which:

FIG. 1 shows the embodiment in a longitudinal section through the swivelling plane of the upper switching member and the axis of the central aperture, whereby the section through the lower switching member is somewhat turned for this purpose;

DETAILED DESCRIPTION

Figure 6:
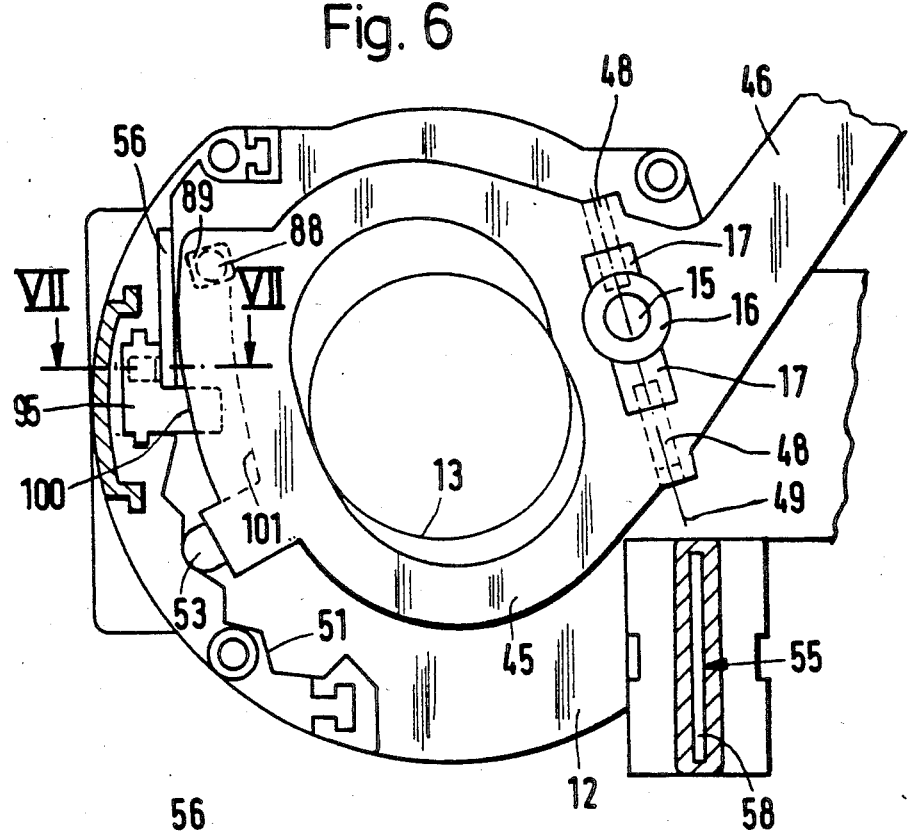
FIG. 6 is a top view of the bottom part of the embodiment with the lower switching member.

The housing 10 of the switch shown in FIG. 1 is substantially composed of four parts. It includes a supporting sleeve 11 which overlaps the steering column tube of a steering spindle and is supported thereon by means of a ball bearing which may be mounted in it; the steering column tube has not been shown in the drawing. On the supporting sleeve 11 is placed a bottom part 12 which has a central, circular aperture 13 for the steering spindle and has a collar 14 which surrounds the outside of the supporting sleeve 11 over a distance. The bottom part 12 carries a bearing journal 15, which extends in parallel to the axis of the aperture 13 and is directed away from the supporting sleeve 11. As best shown in FIG. 6, bearing journal 15 is concentrically surrounded by a bearing bushing 16 with diametrically opposite bearing studs 17 having journal holes which are flush with each other and extend perpendicularly to the bearing journal 15.

The top 18 of the housing 10 has also a central, circular aperture 19. Moreover, a bearing journal 20 is formed thereon which points into the same direction as the bearing journal 15. From FIGS. 5 and 6, which shows the top and the bottom part in the same angular position, can be seen that the two bearing journals 15 and 20 are not exactly diametrically opposite to each other with regard to the central apertures 13 and 19, however they are substantially diametrically opposite to each other. Housing 10 is closed by a metal plate 21, which rests upon supports projecting upwardly from a base plate 22 of the top 18. The bearing journal 20 penetrates a bore of the metal plate 21 with a portion having a smaller diameter and is riveted above this plate. The metal plate 21 is thereby additionally held. Metal plate 21 is also equipped with a central aperture 24. Just as metal plate 21 is spaced from the base plate 22 of the top 18 the base plate 22 of the top 18 is also spaced from the base plate 30 of the bottom part 12, so that two chambers 31 and 32 are formed in the housing 10. Base plate 22 of the top 18 is also supported on supports of the bottom part 12. The bearing journal 15 also forms a support.

Figure 5:
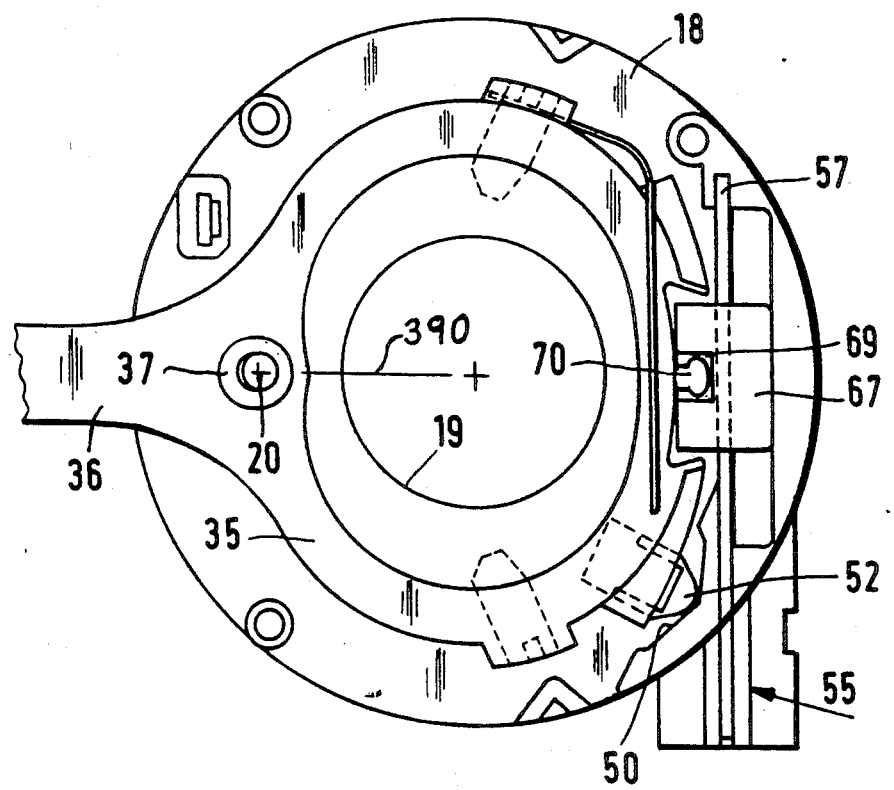
FIG. 5 is a top view on the upper part of the embodiment with the upper switching member.

In the upper chamber 31 there is positioned the upper switching member 35, which, as shown in FIG. 5, is formed annularly and has a central aperture with a much larger diameter than the central apertures of the housing 10. The switching member is swivellably mounted on the bearing journal 20 and can be moved with the actuating lever 36 with which it is made as a single piece. The large opening in the switching member 35 ensures that, when it is swivelled, it does not hit the steering column. The bearing journal 20 is positioned in a slightly longitudinal recess 37 of the switching member 35, which includes a narrower portion adjacent to the base plate 22 of the top 18 and a wider portion. A spiral spring 38 concentrically surrounds the bearing journal 20 and is supported on the shoulder between the two portions of the recess 37 and the metal plate 21. The spiral spring 38 normally holds the switching member 35 and the lever 36 on the base plate 22 of the top 18. However the size of the recess 37 permits the switching member and the lever 36 to be moved towards the metal plate 21 against the force of the spiral spring 38. Thus the switching member 35 can be tilted out of its swivelling plane. With regard to the central apertures 13 and 19, the axis of this tilting motion is positioned opposite to the axis 39 of the bearing journal 20, thus the swivelling axis of the switching member 35.

Lower switching member 45 is positioned in chamber 32. Lower switching member 45 is annularly shaped with a large opening. Switching member 45 can also be swivelled by a lever 46 formed on it as a single piece. The swivelling axis 47 is thereby the axis of the bearing journal 15. In the pocket holes of the bushing 16 and the bores of the switching member 45 flush with them bearing journals 48 are inserted which in FIG. 6 are shown in broken lines. Thus the switching member 45 and the lever 46 can be tilted about the axis 49 of the journals 48 which runs perpendicularly through the axis 47 of the bearing journal 15.

The various switching positions of the two switching members 35 and 45 in their swivelling plane are determined by two locking cams 50 and 51. These are located at inserts of the bottom part 12 and of the top 18 respectively. An indexing bolt 52 or 53 guided in each switching member is pressed against the respective locking cam 50 or 51 by a spring. The locking cam 50 for the upper switching member 35 is planar in a section perpendicularly to the moving direction of the indexing bolt on it. In contrast thereto the locking cam 51 of the lower switching member 45 rises on both sides in a cross-section perpendicular to the moving direction of the indexing bolt 53, while the switching member 45 is swivelled. If the switching member 45 is tilted about the axis 49 the indexing bolt 53 together with its pressure spring thus effects the automatic return of the switching member 45 and of the lever 46, when the latter is released.

Figure 4:
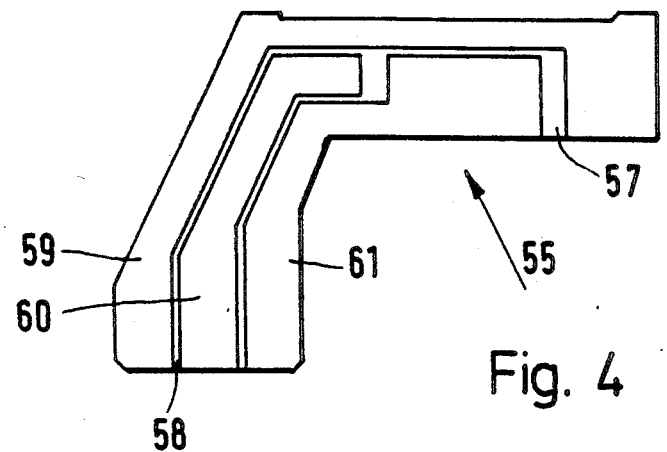
FIG. 4 is a top view on the second insulating plate with the metal conductors for direction indication.

All changeovers effected by tilting or swivelling of one of the two switching members 35 or 45 only take place on two insulating plates 55 and 56 provided with metal conductors, which plates are parallel to each other and stand perpendicularly on the swivelling plane of the two switching members 35 and 45. The two insulating plates 55 and 56 are positioned diametrically opposite each other relative to the central apertures 13, 19 and 24 of the housing 10. Furthermore it can be seen from FIG. 5 that the insulating plate 55 and thus also the insulating plate 56 is arranged in such a way that it stands perpendicularly on a distance line 390 connecting the axis of the central apertures 13, 19 and 24 of the housing 10 with the swivelling axis 39 of the switching member 35. The insulating plate 55 lies opposite the swivelling axis 39 of the switching member 35 relative to the central aperture in the housing 10. It is changed over on this plate, when the switching member 35 is swivelled. So that insulating plate 55 can, if possible, be acted upon in an elongation of the connecting line 390 it has a portion 57 which overlaps the switching member in the area of the swivelling axis 47 of the switching member 45. The plug part 58 of the insulating plate 55 is situated laterally of the swivelling axis 47 of the switching member 45. On its side facing the swivelling axis 39 of the switching member 35 the insulating plate 55 has three metal connectors 59, 60 and 61. As can be seen from the additional reference numerals for metal conductors in FIG. 4, the metal conductors 59 to 61 are provided for direction indication. The second side of the insulating plate 55 can carry the same metal conductors as the first side does to switch the parking light.

Two bridging contacts 65 and 66 co-operate with the metal conductors on both sides of the insulating plate 55, which bridging contacts are pressed from opposite directions onto the insulating plate 55 by pressure springs. The bridging contacts 65 and 66 are suspended in a driver 67, which is provided with a slot 68 into which the insulating plate 55 projects. In the housing 10 and at the insulating plate 55 the driver 67 is guided in such a way that it can be linearly displaced along this insulating plate. Facing the switching member 35 the driver 67 has a recess 69, in which the switching member engages with a mushroom shaped projection 70.

Thereby the driver 67 can be displaced when switching member 35 is swivelled.

If there is no parking light, the metal conductors 59, 60 and 61 on one side of the insulating plate 55 can be through-connected to the corresponding metal conductors on the other side. Thereby contact resistance of a connection from the plug part 58 to the contacts of a bush could be considerably diminished.

The second insulating plate 56 is substantially arranged in a chamber 75 located laterally of the bearing sleeve 11. Chamber 75 is surrounded by walls formed onto the bottom part 12 and closed by a fixed cap 76 and a movable slide 77. The insulating plate 56 divides the chamber into two halves. The half of the chamber 75 which is close to the bearing sleeve 11 is divided by a horizontal partition 78, which is formed onto a bottom 79 resting against the bearing sleeve 11. At the level of this partition 78 the bottom 79 carries a journal 80 which penetrates a bore of the insulating plate 56 as far as slide 77 and has a supporting shoulder 81 for the insulating plate 56. The insulating plate 56 projects from the chamber 75 with a plug part 82.

Figure 3:
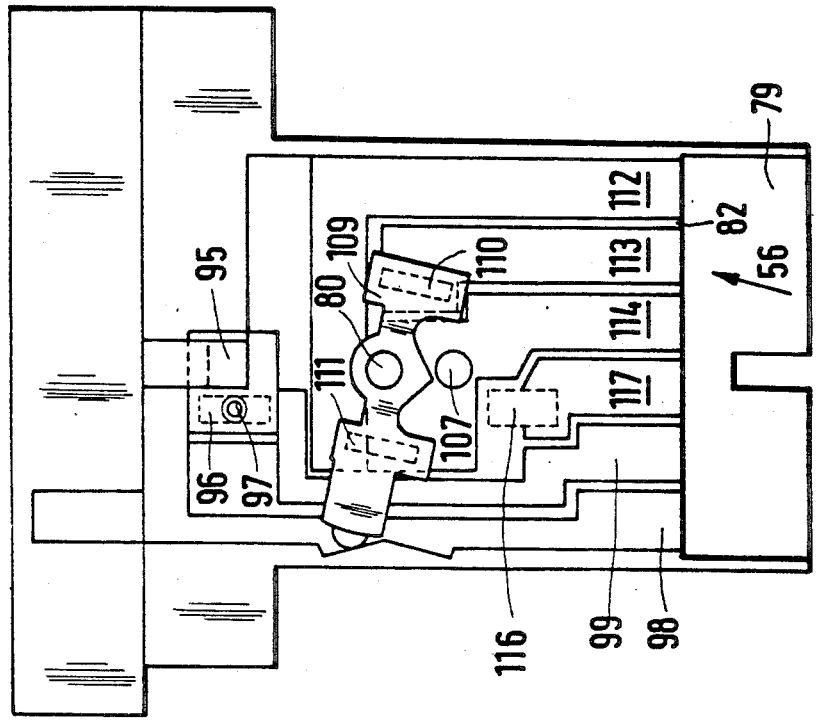
FIG. 3 is a top view on the insulating plate of FIG. 2 in the opposite direction.
Figure 2:
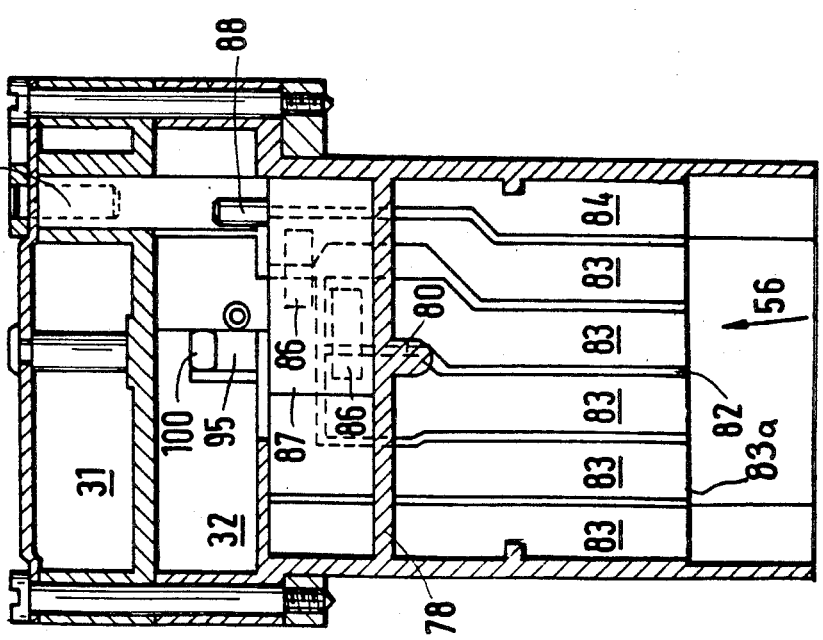
FIG. 2 is a section taken on line II—II of FIG. 1, wherein the switching members have been omitted.

From FIG. 2 can be seen that the insulating plate 56 has a total of six metal conductors 83 and 84 respectively on its side facing the swivelling axis 47 of the switching member 45. As can be seen from the additional reference numerals at the metal conductors 83 they are used to control the windshield wiper system. The metal conductor 84 is conducted below the metal plate 21 of the housing 10, where a contact spring 85 for the horn rests upon it. To provide the necessary connections for the control of the windshield wiper system two bridging contacts 86 are held on a driver 87, which is linearly guided between the base plate 30, the bottom 79 and the partition 78 of the bottom part 12. The driver 87 projects into a recess 89 of the switching member 45 by means of a pin 88. The recess 89 is longitudinally formed in a direction perpendicularly to the tilting axis of the switching member 45, so that the switching member can be tilted about the axis 49 without being impeded by the journal 88 and the switching member and the driver 87 do not get jammed, when the switching member is swivelled.

Figure 7:
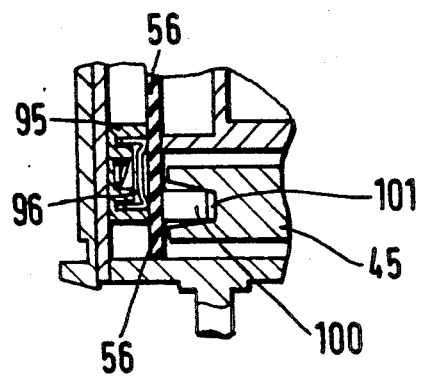
FIG. 7 is a section taken on the line VII—VII of FIG. 6.

Thus drivers 67 and 87 are only moved by the switching member to which they pertain, when the switching member is swivelled. If the switching member is tilted, they remain at rest. To the switching member 45 is assigned a further driver 95 linearly guided in the housing 10 and having a bridging contact 96. As shown in FIGS. 6 and 7 this driver is located on that side of the insulating plate 56 which does not face the swivelling axis 47 of the switching member 45. When the switching member 45 is tilted the driver 95 is moved in one direction which stands perpendicularly on the guide direction of the driver 87. The longitudinal bridging contact 96 extends in the moving direction of the driver 95. The driver can occupy a zero position which is shown in the drawings and an operating position on both sides. In the latter it connects a central contact once with a metal conductor 98 and another time with a metal conductor 99. If the central contact 97 is connected with the metal conductor 98, the windshield wiper system is operated. In the other case the rear window wiper and washer system is switched on. Voltage is conducted to the central contact 97 via the metal conductor designated 83a, which is positioned on the other side of the insulating plate 56 and is through-connected.

The driver 95 engages in a recess 101 of the switching member 45 thereby passing an edge of the insulating plate 56. The recess 101 is formed in such a way that the driver and the switching member 45 cannot get jammed with each other, when the switching member is tilted. Furthermore, as can be seen from FIG. 6, in the swivelling direction of the switching member the recess 101 is considerably longer than the stud 100, so that the switching member can be swivelled without being impeded by the driver 45. The edge of the insulating plate 56, which is passed by the driver 95 with its stud 100, extends in parallel to the moving direction of the driver 95. Thus the edge can rest against the stud 100 and contribute to guide the driver 95.

When the lever 36 and the switching member 35 are tilted, it is switched on that side of the central aperture on which also the swivelling axis is positioned. Further, it is switched on that side which does not face the supporting sleeve 11 or the swivelling axis 47 of the switching member 45. In order to effect the changeover the lever 36 engages in a recess 106 of the slide 77 with a finger 105. The slide 77 takes along the journal 107, which is movable in an oblong hole extending transversely to the displacing direction and is positioned on a crank 108 which is swivellably mounted on the journal 80 and is just being brought into a linear position by a resetting member 112. The journal 107 hits one of the two flanks of a so-called cardioid curve on a switching member 109, which is mounted on the journal 80 and can occupy two stable switching positions. The switching member 109 carries two bridging contacts 110 and 111, of which the bridging contact 110 can connect the metal conductor 112 with the metal conductor 113 and the bridging contact 111 the metal conductor 112 with the metal conductor 114. By movement of the switching member 109 from one switching position into the other switching position switching occurs between high beam and lower beam.

When the slide 77 is pulled upwardly, a driver 115 and a bridging contact 116 suspended thereon are moved with it. The bridging contact 116 already connects the metal conductor 117 with the metal conductor 114, before the switching member 109 has been changed over. When the metal conductors 117 and 114 are interconnected, the high beam flashes up. Thus the so-called headlamp flasher can be realized.

What is claimed is:

1. A steering column switch comprising:
   a housing having a central aperture;
   first and second switching members independently supported in said housing one above the other, said first switching member being swivellable about a first axis, said second switching member being swivellable about a second axis, and first and second axes defining a swivelling plane, said first and second axes being parallel and substantially diametrically opposite each other relative to said aperture, said first and second switching members each being independently tiltable perpendicularly to said swivel plane;
   first switch means comprising a first switch plate including an insulating plate supported in said housing and having conductors thereon, one end of said first switch plate forming an electrical plug part; first contact means movable by said first switching member on said first switch plate to a plurality of first switching positions;

second switch means comprising a second switch plate including a second insulating plate supported in said housing and having conductors thereon, one end of said second switch plate forming a second electrical plug part; second contact means movable by said second switching member on said second switch plate to a plurality of second switching positions;

said switch operating such that tilting said first switching member causes said first switch means to change from one switching position to a second switching position; swivelling of said first switching member causes said first switch means to change from one switching position to another switching position; tilting said second switching member causes said second switch means to change from one switching position to a second switching position; and swivelling of said second switching member causes said second switch means to change from one switching position to another switching position.

2. A steering column switch in accordance with claim 1, wherein:
said first and second insulating plates are arranged at least substantially parallel to each other.

3. A steering column switch in accordance with claim 2, wherein:
said first and second insulating plates are at least substantially opposite to each other relative to said aperture.

4. A steering column switch in accordance with claim 3, comprising:
metal conductors on a first side of said second switch plate for the windshield wiper system and metal conductors on the other side thereof for one or more further wiper or washer systems.

5. A steering column switch in accordance with claim 4, wherein:
one metal conductor of said first side is through-connected to said other side.

6. A steering column switch in accordance with claim 5, comprising:
a metal conductor for a horn on said first side.

7. A steering column switch in accordance with claim 6, comprising:
the metal conductors on said other side for the changeover between high beam and lower beam.

8. A steering column switch in accordance with claim 7, comprising:
metal conductors for direction indication on a first side of said first switch plate.

9. A steering column switch in accordance with claim 8, comprising:
metal conductors on the other side of said switch plate for the parking light.

10. A steering column switch in accordance with claim 2, wherein:
said first and second insulating plates are positioned in said housing in such a way that they stand at least substantially perpendicular to a distance line connecting the axis of said central aperture with said first or second axis.

11. A steering column switch in accordance with claim 10, wherein:
said first insulating plate having portions which overlap said first switching member in the area of said first swivelling axis.

12. A steering column switch in accordance with claim 11, wherein:
said first insulating plate plug portion is positioned lateral to said first swivelling axis.

13. A steering column switch in accordance with claim 12, wherein:
said second switching member is tiltable about a third axis which is perpendicular to said second swivelling axis and that, when said switching member is tilted, said second contact means is moved on said second insulating plate which, said second switch plate and said third axis being positioned on opposite sides of said central aperture.

14. A steering column switch in accordance with claim 13, wherein:
said first switching member comprises an indexing bolt movable along its longitudinal axis, a locking cam and resilient means urging said indexing bolt against said locking cam, said indexing bolt and said locking cam jointly defining said plurality of switching positions relative to said first swivelling axis; and said locking cam having at least a portion which rises such that when said first switching member is swivelled from a stable position, said locking bolt rides up on said portion and when the force causing said first switching member to swivel is reduced, the force of said resilient means causes said indexing bolt to ride down said portion to said stable position to thereby effect the automatic return movement of said first switching member.

15. A steering column switch in accordance with claim 14, wherein:
said first switching member is tiltable about a fourth axis which extends perpendicular to said first swivelling axis and when said first switching member is tilted, said second switch means is operated.

16. A steering column switch in accordance with claim 1, wherein:
at least one of said first and second insulating plate is provided with metal conductors on both sides.

17. A steering column switch in accordance with claim 16, wherein:
at least two metal conductors on different sides of said at least one insulating plate are interconnected in an electrically conductive manner.

18. A steering column switch in accordance with claim 1, wherein:
said first and second contact means each comprises a first bridging contact said first contact means first bridging contact being movable by said first switching member to electrically connect two of said at least two metal conductors on one side of said first switch plate, said second contact means first bridging contact being movable by said second switching element to electrically connect two of said at least two metal conductors on one side of said second switch plate.

19. A steering column switch in accordance with claim 18, wherein:
said first and second contact means each comprises a second bridging contact said first contact means second bridging contact being movable by said first switching member to electrically connect two of said at least two metal conductors on one side of said first switch plate, said second contact means second bridging contact being movable by said second switching member to electrically connect two of said at least two metal conductors on one side of said second switch plate.

20. A steering column switch in accordance with claim 19, wherein:
one of said first bridging contacts is only movable by a tilting of the respective first or second switching member and the second bridging contact on the same one of said first or second switching plates is movable by swivelling of said respective first or second switching member.

21. A steering column switch in accordance with claim 19, wherein:
said first and second bridging contacts for at least one of said first and second contact means are movable by the same movement of the first or second switching member, respectively.

22. A steering column switch in accordance with claim 1, wherein:
said first contact means comprises a bridging contact linearly displaceable on said switch plate to engage a pair of said first switch plate conductors.

23. A steering column switch in accordance with claim 22, wherein:
said bridging contact is coupled with said first switching member in such a way that it is only displaceable to engage said pair of first switch plate conductors upon tilting or only upon swivelling of said first switching member.

24. A steering column switch in accordance with claim 23, wherein:
said bridging contact is carried by a plastics driver which is linearly displaceably guided in said housing and coupled with said first switching member in a manner free from getting jammed.

25. A steering column switch in accordance with claim 24, wherein:
said driver is coupled with said first switching member by an oblong recess in one part and a stud on another part engaging in the recess said stud being freely movably in said recess when said switching member is moved about one axis and said stud rests against a wall of said recess when said first switching member is moved about another axis.

26. A steering column switch in accordance with claim 25, wherein:
said first switch plate projects into a slot of said driver and said driver overlaps said first switch plate and carries a bridging contact on both sides of said first switch plate.

27. A steering column switch in accordance with claim 26, comprises:
a second driver positioned on the side of said second switch plate not facing said second switching member, and a second stud on said second driver engages in a recess on said second switching member thereby passing one edge of said second switching plate.

28. A steering column switch in accordance with claim 27, wherein:
said second driver is displaceable parallel to the edge of said second switch plate.

29. A steering column switch in accordance with claim 28, wherein:
said second stud is positioned on said second driver.

* * * * *